United States Patent [19]

McGinniss

[11] Patent Number: 4,661,534

[45] Date of Patent: Apr. 28, 1987

[54] SURFACE ENHANCEMENT THROUGH CHLORINATION OF THE MOLECULAR SURFACE LAYER OF POLYMERIC SOLIDS

[75] Inventor: Vincent D. McGinniss, Delaware, Ohio

[73] Assignee: Battelle Development Corporation, Columbus, Ohio

[21] Appl. No.: 742,263

[22] Filed: Jun. 7, 1985

[51] Int. Cl.$^4$ ................................................ C08F 2/46
[52] U.S. Cl. .................................... 522/131; 522/132; 522/133; 525/356
[58] Field of Search ......................... 522/131, 132, 133

[56] References Cited

U.S. PATENT DOCUMENTS

| | | | |
|---|---|---|---|
| 2,918,419 | 12/1959 | Findlay | 522/133 |
| 3,156,636 | 11/1964 | Silverman | 522/133 |
| 4,404,256 | 9/1983 | Anand et al. | 522/133 |
| 4,473,451 | 9/1984 | Benedikt et al. | 522/131 |

*Primary Examiner*—Joseph L. Schofer
*Assistant Examiner*—Bernard Lipman
*Attorney, Agent, or Firm*—Benjamin Mieliulis

[57] ABSTRACT

A method for enhancing surface properties of a polymeric solid is disclosed involving chlorination in the presence of actinic light to a depth substantially not in excess of 1800 Å and to a chlorine content by weight in said 1800 Å layer not exceeding 20%. Such limited chlorination of only the molecular surface layer provides enhancement of the polymeric solids' surface and barrier properties without any perceptible deterioration of the polymer's bulk physical properties.

4 Claims, No Drawings

SURFACE ENHANCEMENT THROUGH CHLORINATION OF THE MOLECULAR SURFACE LAYER OF POLYMERIC SOLIDS

FIELD OF INVENTION

This invention relates to surface modification of polymeric solids. More particularly, this invention discloses the discovery that chlorination of the molecular surface layer of polymeric surfaces, especially transparent surfaces, involves a discontinuous phenomena.

DISCLOSURE OF RELATED ART

Chlorination of polymeric solids such as polyolefins is known in the art for purposes of minimizing tackiness attributable to plasticizer migration. Chlorination is also known in the art for purposes of hardening polymeric solids and making such solids UV light resistant through conversion of the entire surface to chloro-saturated polymers.

U.S. Pat. No. 2,276,951 discloses treating polyisobutylene with actinic light such that 20% to 50% chlorine content by weight is obtained throughout a surface thickness of 0.01 inch.

The present invention advances the state of the art based upon the discovery that the improvement in surface properties of polymeric solids is a discontinuous nonlinear phenomena and that above a threshold value actual harmful surface degradation or modification occurs. Applicants have additionally discovered that chlorination to 1800Å depth (one ten-billion$^{th}$ inch), or in other words chlorination of only the molecular surface layer, provides optimum surface improvement.

DETAILED DESCRIPTION OF INVENTION

The inventor has discovered that enhancement of surface properties through surface chlorination of polymeric solids is a discontinuous phenonema. Surface properties are enhanced up to a fine threshold level of chlorine concentration. Above the threshhold level abrupt nonlinear deleterious changes in surface properties occur. Properties such as solvent resistance reflected in solvent contact angles abruptly deteriorate. Haze and flex crazing drastically increase above the threshold level. The rate of increase in density abruptly accelerates above the threshhold level.

The present invention is the discovery of peak enhancement of surface properties by means of a mild surface etch of only the molecular surface layer of polymeric solids. The surprising aspect of the discovered threshhold level is that it lies at least four magnitudes of order lower than taught by the prior art. For example, Fisher (2,276,951) teaches chlorination to a depth of 0.01 inch and a chlorine concentration of 20–50% by weight.

The present invention discloses surprisingly that surface properties of polymeric solids are enhanced when chlorinated to a depth not to exceed 1800 Angstroms and a chlorine concentration in the 1800 Angstroms layer of less than 20%. ($1 Å = 3.937 \times 10^{-9}$ inch) Above this level of concentration and depth of penetration surface properties deteriorate. Such deterioration is particularly severe for transparent polymers.

Gaseous chlorination of solid polymers yields a polymer having a chlorinated surface layer in which the chlorination concentration gradient decreases with penetration or depth into the polymeric solid.

The prior art teaches chlorine penetration to 0.01" for optimum properties. This involves penetration 10,000× further into the polymeric solid than taught by the present invention. Penetration to such depth as taught in the prior art involves chloro-saturation of the surface molecular layer. This saturation chlorination irreparably damages the molecular surface layer of the polymeric solid.

Density, for example, is a major parameter for consideration in the photochlorination modification of polymer molecular surface layers. Table 1 illustrates the relationship between the physical properties of chlorinated polymers and their densities. Table 1 demonstrates simply that changes in physical properties occur when a significant chlorine content is imparted to a polymer.

TABLE 1

Relationship Between Physical Properties of Chlorinated Polymers and Their Densities*

| % Cl | Polymer | Density | Tensile Modulus ASTM D-638 [MPa] · $10^{-3}$ | % Elongation ASTM D-638 | Dielectric Strength [Vcm$^{-1}$] · $10^{-3}$ ASTM D-149 | Permeability PH$_2$O |
|---|---|---|---|---|---|---|
| 0% | Polyethylene | 0.85 to 1.00 | 0.1 to 1.2 | 800–900 | 180–390 | low |
| 57% | Chlorinated Polyethylene, i.e. Polyvinyl chloride (PVC) | 1.38 to 1.52 | 2.4 to 4.1 | 2–40 | 160–590 | high |
| 73% | Chlorinated Polyethylene, i.e. Polyvinylidene chloride (PVDC) | 1.65 to 1.95 | 0.34 to 0.55 | 250 | 160–240 | low |

*Information obtained from Polymer Handbook, Second Edition, J. Brandrup and E. H. Immergent, editor, J. Wiley, 1975.

Table 2 lists relative density information concerning chlorinated hydrocarbons. As Table 2 illustrates, the density of chlorinated materials is not a linear function of the % chlorine content in the molecular structure from 0 to 80% chlorine by weight. From 0 to approximately 36–65% Cl the slope of a line relating % Cl versus the density of chlorinated hydrocarbons minus the density of nonchlorinated parent hydrocarbon (dCl-d$_o$) is 1.19 while the slope of a line between 45 and 75% chlorine (dCl-d$_o$) is 0.66. Hence physical property correlations or expected performance characteristics cannot be simply linearly extrapolated from high to low or low to high levels of chlorine on a molecular surface.

TABLE 2

Densities and % Cl of hydrocarbon materials

| Structure Chlorinated Compound | Structure Unchlorinated Compound | % Cl | dCl | Density of non-chlorinated parent hydrocarbon do | Δd = dCl − do |
|---|---|---|---|---|---|
| $C_{18}H_{37}Cl$ | — | 12 | 0.849 | | 0.072 |
| | $C_{18}H_{38}$ | 0 | | 0.777 | |
| $C_{14}H_{29}Cl$ | | 15 | 0.8589 | | 0.0959 |
| | $C_{14}H_{30}$ | 0 | | 0.763 | |
| $C_{10}H_{21}Cl$ | | 20 | 0.868 | | 0.138 |
| | $C_{10}H_{22}$ | 0 | | 0.730 | |
| $C_{10}H_{20}Cl_2$ | | 34 | 0.999 | | 0.269 |
| $C_8H_{15}Cl$ | | 24 | 0.875 | | 0.172 |
| | $C_8H_{18}$ | 0 | | 0.703 | |
| $C_7H_{15}Cl$ | | 26 | 0.881 | | 0.197 |
| | $C_7H_{16}$ | 0 | | 0.684 | |
| $C_7H_{14}Cl_2$ | | 42 | 1.064 | | 0.38 |
| $C_6H_{13}Cl$ | | 29 | 0.879 | | 0.22 |
| | $C_6H_{16}$ | 0 | | 0.659 | |
| $C_6H_{12}Cl_2$ | | 46 | 1.068 | | 0.409 |
| $C_5H_{11}Cl$ | | 33 | 0.882 | | 0.256 |
| | $C_5H_{12}$ | 0 | | 0.626 | |
| $C_5H_{10}Cl_2$ | | 50 | 1.106 | | 0.48 |
| $C_5H_9Cl_3$ | | 61 | 1.253 | | 0.63 |
| $C_6H_{10}Cl_4$ | | 63 | 1.32 | | 0.661 |
| | $C_6H_{14}$ | 0 | | 0.659 | |
| $C_6H_9Cl_5$ | | 69 | 1.37 | | 0.771 |

Chlorination to only 1800Å depth and not exceeding 20% chlorine by weight i.e. chlorination of only the molecular surface layer provides polymeric solids having enhanced solvent resistance, dirt resistance, and resistance to penetration by highly toxic agents such as chemical warfare agents. Chlorination of a polymeric solid to achieve such achievements in barrier properties without perceptibly deteriorating any of the bulk physical properties of the polymeric solid is highly desirable.

The process of the present invention successfully produces chlorine groups only on the surface of a polymer in relatively low concentrations (see Table 3).

TABLE 3

ESCA Data of Chlorinated Polymeric Materials

| Polymer Substrate | Average % of Chlorination (1200Å) |
|---|---|
| polyethylene | 13% |
| Butyl rubber | 17% |
| EPDM | 6% |
| polycarbonate | 5% |
| nitrile rubber | 10% |
| neoprene | 12% |
| Fire hose | 4% |

The % $Cl_2$ in the reaction feed mixture causes chlorine functional groups to be formed on the polymer surface in a non-linear manner (Table 4). Both the % $Cl_2$ in the reaction feed mixture and the actual % Cl on the polymer surface cause a non-linear change in density for the modified polymer system (Table 4).

TABLE 4

| % Cl on the polymer surface | % $Cl_2$ in the reaction gas feed mixture (30 min. reaction time) | Change in polymer (polyethylene) density |
|---|---|---|
| 0 | 0 | 1.187 |
| 2–3 | 10 | 1.1882 |
| 3–4 | 40 | 1.1880 |
| 5–6 | 50 | 1.1894 |
| 5–7 | 65 | 1.193 |
| 5–7 | 100 | 1.20 |

Effect of Chlorine (reaction mixture and polymer surface) on the change in density of a polyethylene sample.

Changes in Physical Properties

The changes in % haze and contact angle for surface chlorinated polypropylene, ethylene propylene rubber and polyethylene as a function of % $Cl_2$ in the reaction feed mixture are shown in Tables 5 and 6.

TABLE 5

| % $Cl_2$ in the reaction mixture feed (30 min. reaction time) | % haze polypropylene and ethylene propylene rubber |
|---|---|
| 0 | 10–12 |
| 10 | 14–15 |
| 50 | 15–18 |
| 60 | 16 |
| 85 | 18 |
| 100 | 20 |

TABLE 6

| (a) % $Cl_2$ in the reaction feed gas mixture | (b) Contact angle for 5%/45% isopropyl alcohol IPA/$H_2O$ ∠θ° | (c) Contact angle for 10%/90% isopropyl alcohol IPA/$H_2O$ | (d) Contact angle for 25%/75% isopropyl alcohol IPA/$H_2O$ | (e) Contact angle for 35%/65% isopropyl alcohol IPA/$H_2O$ |
|---|---|---|---|---|
| 0% | 76 | 70 | 60 | 45 |
| 10 | 65 | 55 | 32 | 19 |
| 50 | 72 | 58 | 34 | 17 |
| 100 | 70 | 57 | 32 | 14 |

Table 6 is particularly instructive of the phenomena of the present invention. Note that in any individual column b, c, d or e, that after 10% chlorine when higher levels of chlorine are used in the feed mixture the contact angle deteriorates following initial chlorine exposure. Nothing is gained with additional chlorine exposure and in fact harmful degradation occurs. Table 7 further demonstrates this harmful degradation when further exposure occurs. Note in previous Table 6 that in row 2 the contact angle changed as compared to row 1. In other words, the surface energies changed. Further exposure (rows 3 and 4) caused no further appreciable change in the surface properties.

TABLE 7

| Substrate | Cl$_2$ Concentration (% in N$_2$) | Properties | HD—CW Agent Permeation |
|---|---|---|---|
| Neoprene Rubber Glove | 10 to 50% | Flexible | None |
| Neoprene Rubber Glove | 50 to 100% | Cracked | — |
| Neoprene Rubber Glove | 0 | Flexible | HD Permeable |

HD—CW is a mustard gas (dichloroethylene sulfide - Cl—CH$_2$—CH$_2$—S—CH$_2$—CH$_2$—Cl) reaction time 30 min. (2 lamps)

TABLE 8

| Substrate | Cl$_2$ Concentration (% in N$_2$) | % Haze |
|---|---|---|
| EPDM (clear) rubber | 0 | 6.9 |
|  | 14 | 7.0 |
|  | 50 | 8.0 to 14 |
|  | 100 | 18.4$^{(a)}$ |

$^{(a)}$exhibited severe hazing and cracking upon flexing reaction time 30 min. (2 lamps)

Table 8 demonstrates further that exposure to gaseous chlorine in conentrations and exposures exceeding 14% for 30 minute time periods results in increased hazing and thus supports the invention that chlorination of only the molecular surface layer is desirable.

The present process improves over prior art processes by teaching that the molecular surface layer characteristics of a polymeric solid, particularly transparent solids and solids such as polyalkenes, butyl rubbers, polycarbonates, nitrile rubbers and neoprenes, are enhanced when the polymeric solid is chlorinated by gaseous chlorine in the presence of actinic light such that chlorination does not exceed a depth of 1800Å and a chlorine content not above 20% by weight.

It is possible to practice the invention by pre-irradiating the chlorine gas with actinic light before contacting the surface of the polymeric solid; however, simultaneous exposure is preferred.

While the invention has been described with respect to preferred embodiments, other equivalents will be apparent to those skilled in the art, thus, it is intended that the invention be limited only by the scope of the appended claims.

What is claimed is:

1. An improved process for enhancing the molecular surface layer characteristics of unhalogenated polymeric solids of the type wherein the polymeric solid is chlorinated by gaseous chlorine in the presence of actinic light wherein the improvement comprises chlorinating the surface of the polymeric solid to a depth substantially not in excess of 1800Å and to a chlorine content by weight in said 1800Å layer not exceeding 20%.

2. The process according to claim 1 wherein the polymeric solid is transparent.

3. The process according to claim 1 wherein the polymeric solid is selected from the group consisting of polyethylene, polypropylene, butyl rubber, polycarbonate, nitrile rubber, neoprene, and ethylene-propylenediamine.

4. The process according to claim 1 wherein the chlorine gas is pre-irradiated with actinic light before contacting the surface of the polymeric solid.

* * * * *

UNITED STATES PATENT AND TRADEMARK OFFICE
CERTIFICATE OF CORRECTION

PATENT NO. : 4,661,534
DATED : April 28, 1987
INVENTOR(S) : Vincent D. McGinniss It is certified that error appears in the above—identified patent and that said Letters Patent is hereby corrected as shown below:

Column 2, line 61, "36" should read -- 35 -- .

Signed and Sealed this

Eighth Day of September, 1987

Attest:

DONALD J. QUIGG

Attesting Officer

Commissioner of Patents and Trademarks